(12) United States Patent
Lindsay (10) Patent No.: US 11,094,077 B2
(45) Date of Patent: Aug. 17, 2021

(54) SYSTEM AND PROCESS FOR MOBILE OBJECT TRACKING

(71) Applicant: John Lindsay, Dallas, TX (US)

(72) Inventor: John Lindsay, Dallas, TX (US)

( * ) Notice: Subject to any disclaimer, the term of this patent is extended or adjusted under 35 U.S.C. 154(b) by 0 days.

(21) Appl. No.: 16/597,216

(22) Filed: Oct. 9, 2019

(65) Prior Publication Data
US 2020/0302638 A1   Sep. 24, 2020

Related U.S. Application Data

(60) Provisional application No. 62/820,254, filed on Mar. 18, 2019.

(51) Int. Cl.
*G06T 7/73* (2017.01)
*G06K 9/00* (2006.01)
*G06T 7/80* (2017.01)

(52) U.S. Cl.
CPC .............. *G06T 7/73* (2017.01); *G06K 9/0063* (2013.01); *G06T 7/80* (2017.01); *G06T 2207/30204* (2013.01)

(58) Field of Classification Search
CPC ... G06T 7/73; G06T 7/80; G06T 2207/30204; G06K 9/0063
See application file for complete search history.

(56) References Cited

U.S. PATENT DOCUMENTS

| | | | | |
|---|---|---|---|---|
| 5,596,332 A * | 1/1997 | Coles | ................... | G01S 5/0009 342/455 |
| 7,192,152 B1 * | 3/2007 | Hesse | ................... | A63B 71/06 2/905 |
| 8,559,757 B1 * | 10/2013 | Kia | ................... | G06T 7/337 382/294 |
| 9,367,067 B2 * | 6/2016 | Gilmore | ............... | G05D 1/0094 |
| 9,663,227 B1 * | 5/2017 | Lema | ................... | G05D 1/0016 |
| 9,769,387 B1 * | 9/2017 | Beard | ................... | G06K 9/0063 |
| 9,896,202 B2 * | 2/2018 | Jourdan | ............... | G05D 1/042 |
| 9,964,951 B1 * | 5/2018 | Dunn | ................... | G08G 5/0052 |
| 10,395,544 B1 * | 8/2019 | Harris | ................... | G08G 5/0069 |
| 10,429,487 B1 * | 10/2019 | Fowe | ................... | G01S 19/12 |
| 10,599,139 B2 * | 3/2020 | Lema | ................... | G05D 1/0016 |

(Continued)

FOREIGN PATENT DOCUMENTS

| | | | | |
|---|---|---|---|---|
| CN | 102818568 | | 12/2016 | |
| DE | 102016003707 | A1 * | 10/2017 | ........... G05D 1/0676 |
| DE | 102017105158 | | 9/2018 | |

*Primary Examiner* — David E Harvey
(74) *Attorney, Agent, or Firm* — John Lindsay (57) ABSTRACT

Embodiments include system and processes for tracking objects using a camera. An optical marker dictionary including one or more optical markers is generated, the optical markers being optically distinct indicators. An optical marker within the optical marker dictionary is associated with and affixed to an object. A processor is in communication with the camera, receiving image data from the camera and applying computer vision to the image data in order to detect the presence of one or more optical markers within the optical marker dictionary within the image data. The processor determines camera position information and applies computer vision to the image data in order to determine relative position information for the detected optical markers and projects a position from the camera to a detected optical marker.

19 Claims, 9 Drawing Sheets

(56) References Cited

U.S. PATENT DOCUMENTS

| | | | | |
|---|---|---|---|---|
| 10,765,091 B2* | 9/2020 | Miyahara | | G06K 9/78 |
| 10,767,990 B2* | 9/2020 | Sasaki | | G06K 9/2063 |
| 2002/0070281 A1* | 6/2002 | Nimura | | G06K 7/12 |
| | | | | 235/494 |
| 2003/0085997 A1* | 5/2003 | Takagi | | G11B 27/031 |
| | | | | 348/143 |
| 2009/0125223 A1* | 5/2009 | Higgins | | G06T 7/246 |
| | | | | 701/532 |
| 2010/0177363 A1* | 7/2010 | Zhou | | G06K 7/14 |
| | | | | 358/474 |
| 2010/0215212 A1* | 8/2010 | Flakes, Jr. | | G06K 9/00637 |
| | | | | 382/100 |
| 2011/0071792 A1* | 3/2011 | Miner | | H04N 21/854 |
| | | | | 702/182 |
| 2011/0163908 A1* | 7/2011 | Andersson | | G01S 13/933 |
| | | | | 342/36 |
| 2011/0234819 A1* | 9/2011 | Gabriel | | H04N 1/00137 |
| | | | | 348/207.1 |
| 2012/0287274 A1* | 11/2012 | Bevirt | | G05D 1/0094 |
| | | | | 348/144 |
| 2013/0033381 A1* | 2/2013 | Breed | | B60T 7/16 |
| | | | | 340/568.1 |
| 2014/0257595 A1* | 9/2014 | Tillmann | | G05D 1/0022 |
| | | | | 701/2 |
| 2015/0116505 A1* | 4/2015 | Stout | | H04N 5/23203 |
| | | | | 348/169 |
| 2016/0071379 A1* | 3/2016 | McKiel, Jr. | | G01S 1/68 |
| | | | | 340/691.6 |
| 2016/0097644 A1 | 4/2016 | Strassenburg-Kleciak | | |
| 2016/0304198 A1* | 10/2016 | Jourdan | | G05D 1/0088 |
| 2017/0202185 A1* | 7/2017 | Trumbull | | G16H 40/67 |
| 2017/0217589 A1* | 8/2017 | Maekawa | | B64C 39/024 |
| 2017/0244937 A1* | 8/2017 | Meier | | B64C 39/024 |
| 2017/0249491 A1* | 8/2017 | MacIntosh et al. | | |
| | | | | G06K 7/10861 |
| 2017/0287343 A1* | 10/2017 | Bietz | | B64C 39/024 |
| 2017/0291704 A1 | 10/2017 | Alegria | | |
| 2017/0299727 A1* | 10/2017 | Irish | | G01S 19/22 |
| 2018/0091875 A1* | 3/2018 | Bryson | | G08B 21/0453 |
| 2018/0096541 A1* | 4/2018 | O'Brien | | G06K 9/00637 |
| 2018/0259342 A1* | 9/2018 | Bitra | | G05D 1/102 |
| 2018/0274920 A1* | 9/2018 | Sasaki | | G06K 9/2063 |
| 2018/0292374 A1* | 10/2018 | Dittberner | | G08G 5/0039 |
| 2018/0341812 A1* | 11/2018 | Floor | | G06K 9/00724 |
| 2019/0101934 A1* | 4/2019 | Tuukkanen | | G05D 1/101 |
| 2019/0122568 A1* | 4/2019 | Nevdahs | | G05D 1/106 |
| 2019/0187724 A1* | 6/2019 | Li | | G05D 1/042 |
| 2019/0310640 A1* | 10/2019 | Yokoi | | H04N 5/23299 |
| 2019/0325279 A1* | 10/2019 | Wang | | G06K 19/06037 |
| 2019/0377345 A1* | 12/2019 | Bachrach | | G06T 7/20 |
| 2020/0066034 A1* | 2/2020 | Tham | | G06T 7/579 |
| 2020/0302638 A1* | 9/2020 | Lindsay | | G06T 7/246 |
| 2020/0351901 A1* | 11/2020 | Kahn | | G08G 1/161 |
| 2021/0132612 A1* | 5/2021 | Wang | | G08G 5/0013 |

* cited by examiner

SYSTEM AND PROCESS FOR MOBILE OBJECT TRACKING

BACKGROUND

Field of the Invention

The present invention relates to object tracking, more specifically to object tracking using optical systems.

Description of the Related Art

It can be helpful to track a distinct, moving object or objects over time using a camera.

SUMMARY

Embodiments of the present invention are directed to system and processes for tracking objects using an imager. An optical marker dictionary including one or more optical markers is generated, the optical markers being optically distinct indicators. An optical marker within the optical marker dictionary is associated with and affixed to an object. A processor is in communication with the imager, receiving image data from the imager. The processor applies computer vision to the image data in order to detect the presence of one or more optical markers within the optical marker dictionary within the image data. The processor determines camera position information and applies computer vision to the image data in order to determine relative position information for the detected optical markers. Employing the camera position information and the detected optical markers relative position as input, the processor projects a position from the camera to a detected optical marker.

These and other features, aspects, and advantages of the invention will become better understood with reference to the following description, and accompanying drawings.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
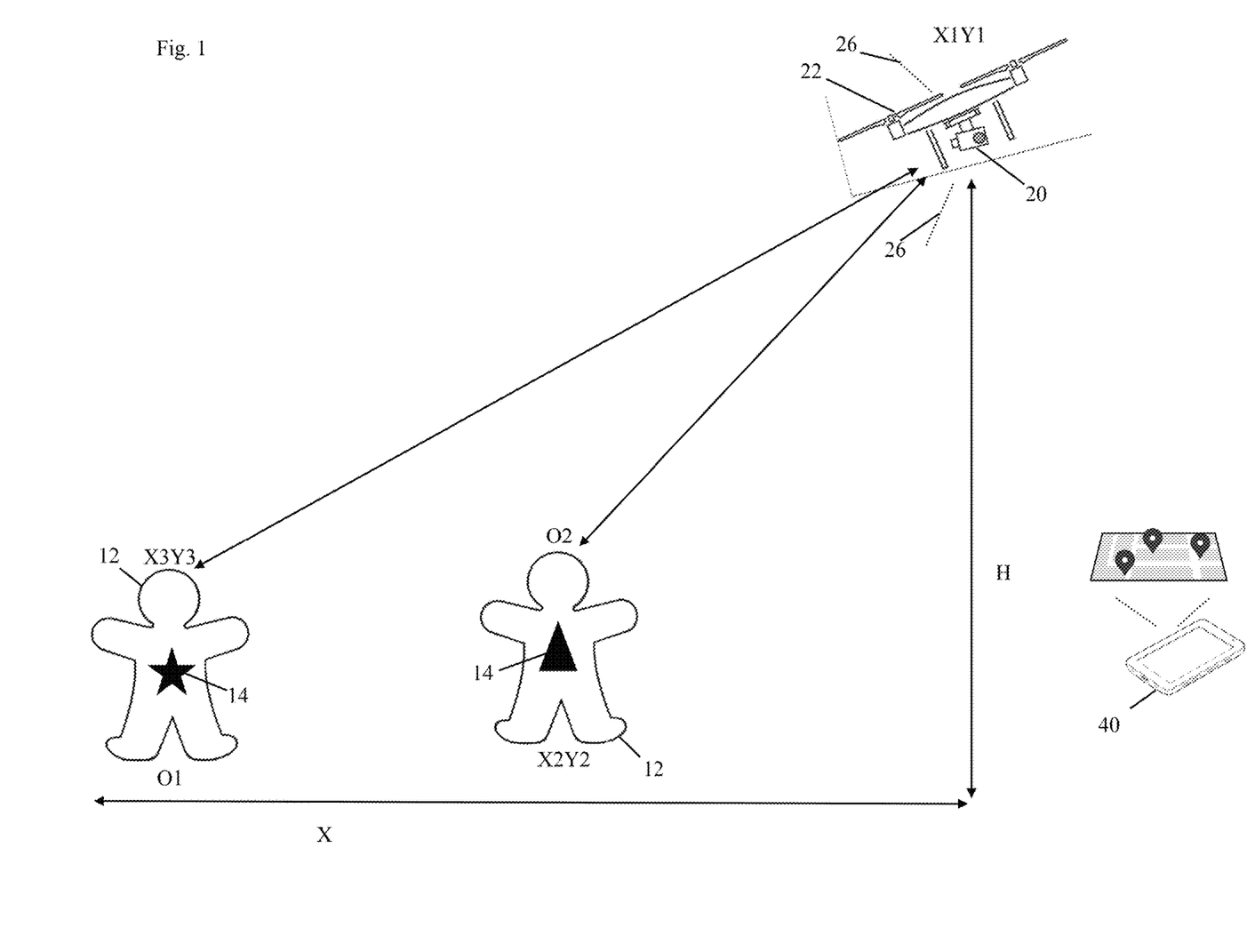
FIG. 1 depicts a diagram of major components of a system for an embodiment of the current invention as it may exist in operation.

Embodiments of the present invention are directed to systems and processes for object tracking using an imager to detect optical markers affixed to those objects. FIG. 1 illustrates an embodiment of systems according to the present invention. Depicted are objects 12 (O1, O2), with affixed optical markers 14, within the field of view 26 of one or more cameras 20, the cameras 20 in communication with a computer 40.

Objects 12 include mobile items, such as people. For example, persons 12 might be a police officer or soldier in an emergency scenario in an urban theatre. In other cases, a person 12 might be a child in theme park.

Figure 3:
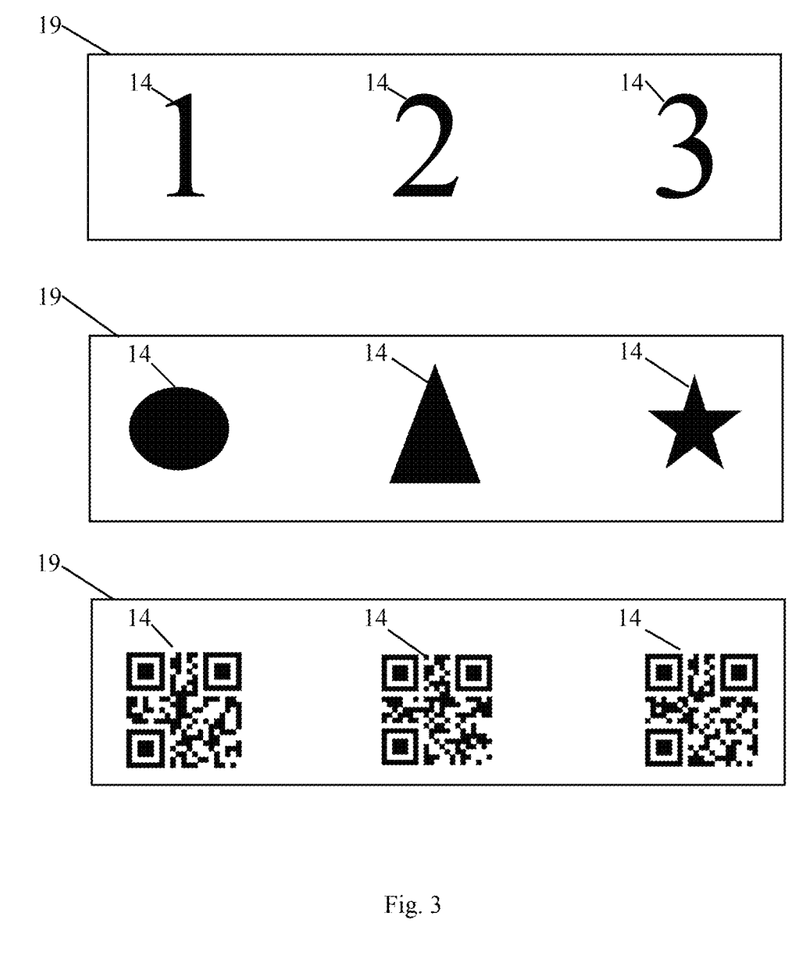
FIG. 3 depicts representative optical markers and optical marker dictionaries.

Optical markers 14 are optically distinct indicators to be displayed on an object 12 and associated with that particular object 12 to which computer vision will be applied to detect and classify the optical marker 14. FIG. 3 illustrates example optical markers 14 with unique, optically detectable, distinguishable characteristics. Exemplary optical markers 14 are those which are detected and classified with minimal processing time, false positives, and false negatives for an environment and camera. Representative distinct characteristics includes shapes and spectrum. Representative suitable optical marker 14 shapes include, but are not limited to, alphanumeric or symbols. In certain configurations, suitable optical markers 14 include letters, numbers, or symbols of a language such as 0-9, a-z, and A-Z. For example, an optical marker 14 can include symbols such as a circle, square, triangle, star, wrench, gear, or other shapes. In certain configurations, machine-readable optical label formats such as bar codes, QR codes, or the like are included, where the encoded content differs, providing distinct optical markers. Representative suitable spectrum include the visible spectrum and others such as ultraviolet, infrared, or others known in the art to be detectable by camera 20 sensors. In certain configurations, an optical marker 14 is generated with known, target dimensions, such as a length and width. In certain configurations, the optical marker 14 can be configured to be temporary detectable. For example, the optical marker 14 may fade over a period of time. In certain configurations, one or more optical characteristics are combined for an optical marker 14, such as a shape having a particular color. An optical marker dictionary 19 includes multiple, distinct optical markers 14.

Figure 2A:
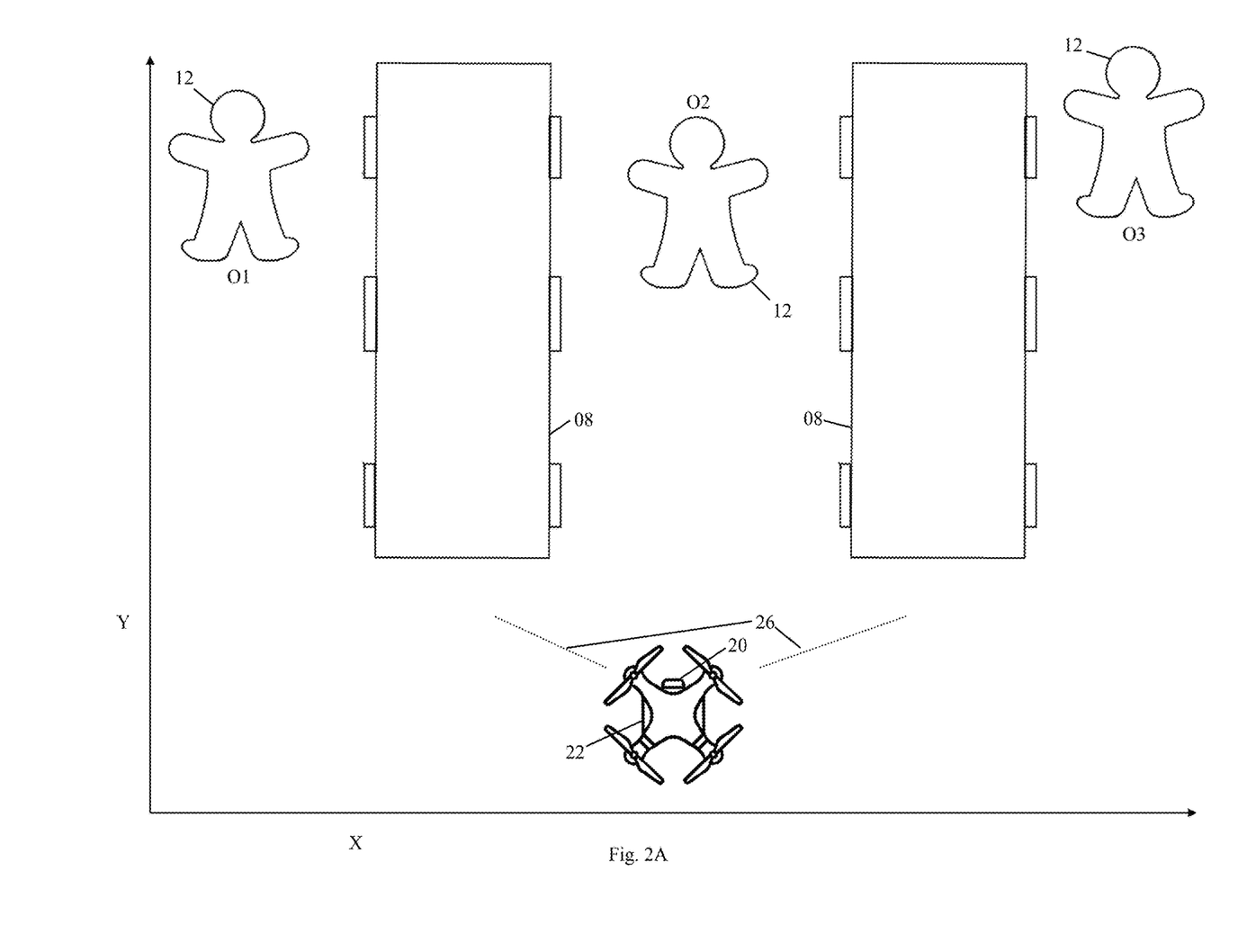
FIGS. 2A-2C depict a diagram of major components of a system for an embodiment of the current invention as it may exist in operation.
Figure 2B:
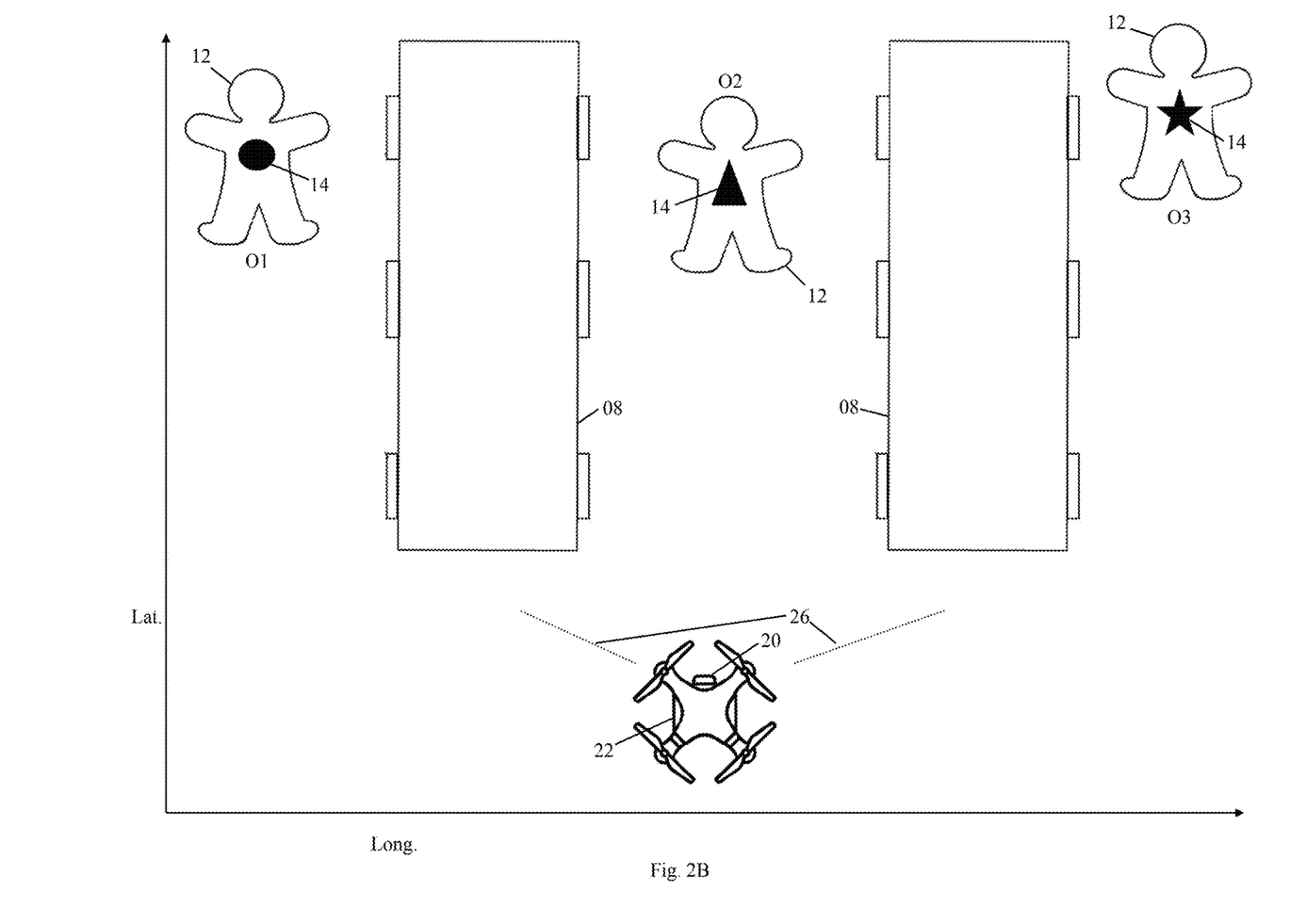

An optical marker 14 is affixed to and associated with the object 12. FIG. 2B illustrates an optical marker 14 affixed to a person 12. The optical marker 14 is affixed to an exposed area of the object 12, such as the torso or helmet. Certain configurations include an adhesive label having a print surface one side and an adhesive surface. In such configurations, a printer having a suitable inks, toners, or other substrate is used to imprint the optical marker 14 on the print surface. For example, a printer with print media to match the desired optical characteristics for the desired optical marker 14 is used to imprint the desired optical marker 14 to the print surface. The printed label bearing the optical marker 14 can then be affixed to the person 12. In other configurations, the optical marker 14 is incorporated in fabric, where it can be incorporated into garments such as a shirts, vests, jackets, wraps, helmet covers, or the like. In such configurations, fabric using suitable thread, dyes, screens, or other substrate or substrate applicator is used to incorporate the optical marker 14 with the fabric. Certain configurations include an electronic visual display such as liquid crystal displays, electroluminescent displays, LED displays, quantum dot displays, electronic paper displays, and the like. In such configurations, lighting of the appropriate spectrum is used to display the optical marker 14.

An imager 20, such as a camera 20 is a device for recording visual images in the forms of image data such as still or video signals. A suitable camera 20 is one which detects the corresponding wavelength(s) of the optical marker 14, such as the common visual spectrum, fluorescent, infrared, ultraviolet, or other spectrum using filters, sensors, post-processing or other means known in the art. In certain configurations, one or more cameras 20 is deployed and oriented to a target area, typically above it, operable to monitor for optical markers 14 within the field(s) of view 26. For example, cameras 20 might be within a unmanned aerial vehicle 22 or street light assembly. One or more cameras 20 may form a network for multiple fields of view 26 or an extended field of view 26, stitching the fields of view in certain configurations.

The cameras 20 are in communication with a computer 40, the computer operable to process image data from the camera(s) 20. A computer, as referred to in this specification, generally refers to a system which includes a processor, memory, a screen, a network interface, and input/output (I/O) components connected by way of a data bus. The I/O components may include for example, a mouse, keyboard, buttons, or a touchscreen. An exemplary computer is a portable computer such as a handheld computer, smartphone, or tablet computer, wearable (eg glasses, watches), such as an iOS device, Android based device, or other similar computer. The portable computer is optionally configured with a touch screen and integrated camera elements. Those skilled in the art will appreciate that the computer can take a variety of configurations, including personal computers, hand-held devices, multi-processor systems, microprocessor-based electronics, network PCs, minicomputers, mainframe computers, and the like. Additionally, the computer may be part of a distributed computer environment where tasks are performed by local and remote processing devices that are communicatively linked. Although shown as separate devices, one skilled in the art can understand that the structure of and functionality associated with the aforementioned elements can be optionally partially or completely incorporated within one or the other, such as within one or more processors. The computers 40 are communicatively coupled with the one or more cameras 20 over wired or wireless connection.

Figure 4:
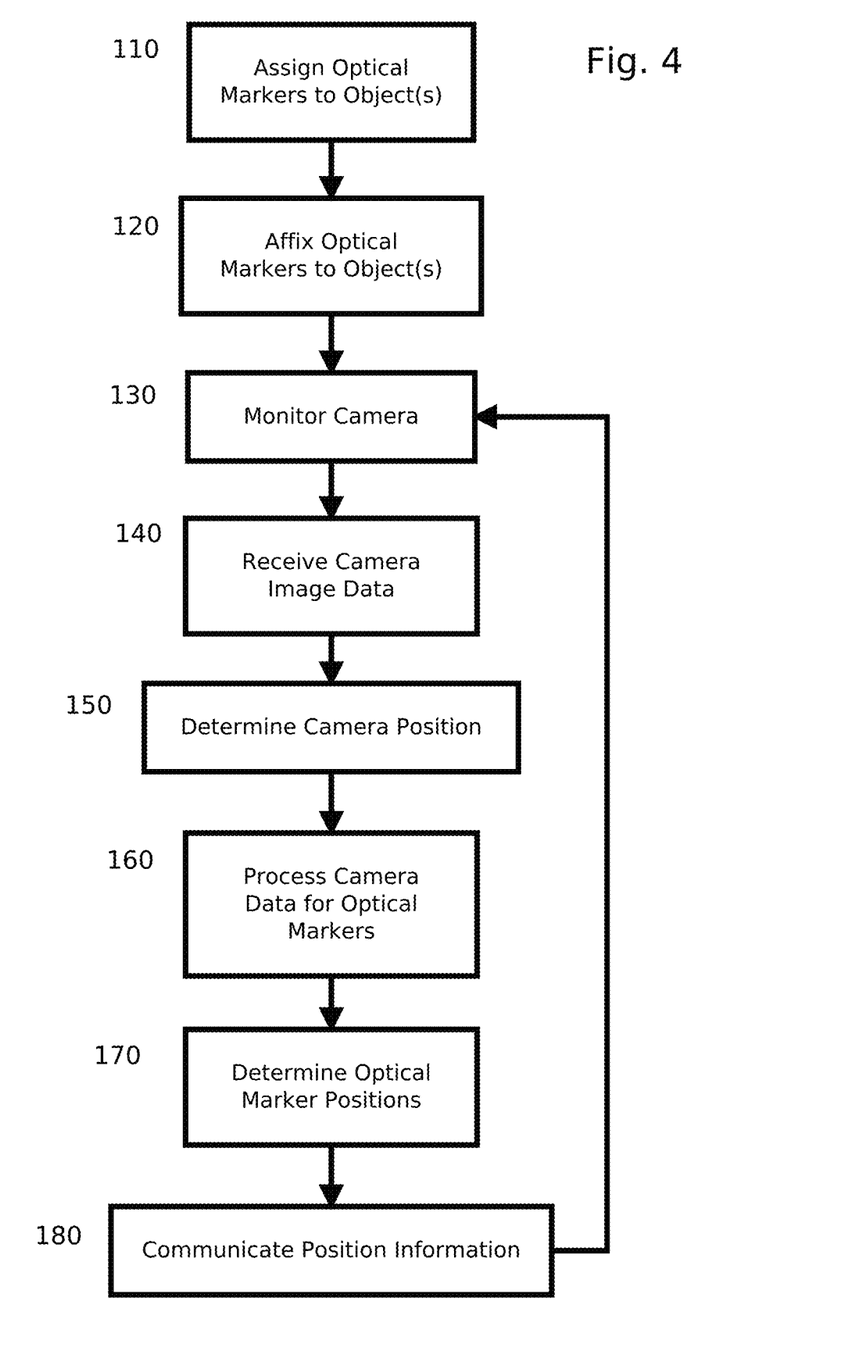
FIG. 4 depicts a flowchart for an embodiment of a process of the current invention.

FIG. 4 illustrates an embodiment of a process of the current invention. At step 110, optical markers are assigned to the objects. At step 120, optical markers are affixed to the objects. At step 130, cameras are monitored. At step 140, image data is received from the cameras. At step 150, camera position is determined. At step 160, camera data is processed for optical marker detection. At step 170, optical marker positions are determined. At step 180, position information is communicated. More consideration of each of the steps is given below.

At step 110, optical markers are assigned to the objects. At step 110, one or more optical markers 14 is created and/or selected for the scenario. FIG. 2A generally illustrates a sample environment for a given scenario, a building interior with large items that can be barriers to persons 12 being directly visible to one another. A unique optical marker 14 is selected for each object 12 to be monitored. Factors in selecting an optical marker set 19 include selecting optical markers 14 that can be reliably detected in the target environment and that have low probability for detection collision with another optical marker 14 in the set. For example, a green colored optical marker 14 would likely be avoided in a forest target area and selecting oval and circle optical marker 14 within the same optical marker dictionary 19 would likely be avoided. In exemplary configuration, the assigned objects 12 are associated with an object identifier. For instance, a circle optical marker 14 might be associated with an "O1" object identifier. Further information may be associated with the object identifier, such as skills or properties of the object 12.

At step 120, optical markers 14 are affixed to the object(s) to an exposed area, such as a head or body. In exemplary configuration, a unique optical marker 14 is affixed to each object 12. In other configurations, a unique optical marker 14 is affixed to classes or categories of objects 12. For instance, where the target medium for the optical marker 14 is an adhesive label, the optical marker 14 is imprinted on the print surface and the label placed on an exposed part of the object 12. For instance, where the target medium for the optical marker 14 is a fabric, the optical marker 14 is sewn, dyed, screened, or otherwise incorporated into the fabric and the fabric is donned on the object 12. For instance, where the target medium for the optical marker 14 is an electronic visual display, the optical marker 14 image data is transmitted to the electronic visual display and the electronic visual display is secured to the object 12. FIG. 2B generally illustrates optical markers 14 associated and affixed to objects 12.

At step 130, cameras 20 are monitored. Cameras 20 and objects 12 are deployed or otherwise move about an area. For example, unmanned aerial vehicles 22 with cameras 20 or street lights with cameras 20 may be deployed. One or more cameras 20 are in communication with one or more computers 40. Communication of the image data from the camera(s) 20 is enabled and set up. For instance, the camera 20 of a unmanned aerial vehicle 22 communicate setup can include enabling a radio, such as an 802.11 connection, or a tether. For instance, the camera 20 of a street light may include a network card for wide area network communication.

At step 140, image data from cameras 140 is received by the computer. In certain configurations, the optical characteristics about the image or camera(s) 20 are received, such as the focal length field width, zoom capabilities, current zoom, current focus, and other information.

At step 150, the camera 20 position is determined. In certain configurations, the position is periodically updated, with position information having associated timestamps. It is within the scope of the invention to employ absolute, relative, or hybrid positioning. In configurations that employ absolute positioning, position information from global navigation systems can be employed. For instance, affixed with the camera 20 are receivers for systems such as the Global Positioning System, Galileo, GLONASS, Wi-Fi positioning systems, indoor positioning systems, or the like. Position information received from absolute positions systems is commonly received as latitude, longitude, and altitude information.

Figure 2C:
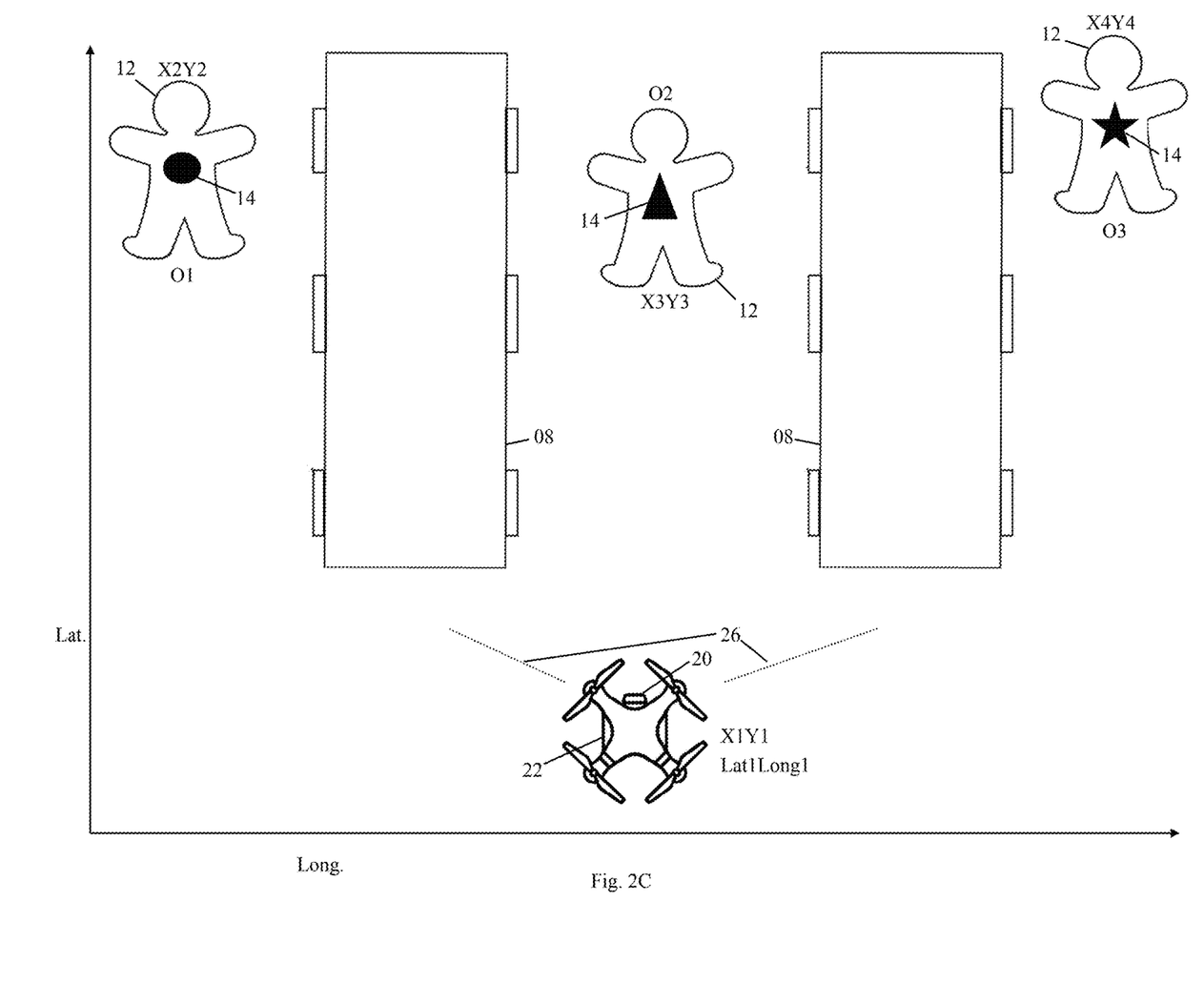

In configurations that employ relative positioning, position information from an origin point can be employed. Suitable origin points can include an earlier position of the camera 20 (such as the launch position of the unmanned aerial vehicle 22 to which the camera 20 is affixed or the known position of the street light to which the camera 20 is affixed), anchor nodes (nodes with known fixed position), or other means known in the art. Over time, position information is updated if the camera 20 position changes. For example, speeds and directions of travel over time, time of flight/time of arrival signal processing from a reference device with a known location, and other means known in the art can be employed to determine position relative to an origin point. FIGS. 1 and 2C illustrate representative display of camera 20 position.

At step 160, the camera 20 image data is processed for optical markers 14. Periodically, the computer 40 receives image data from the camera 20 in order to detect the presence of optical markers 14. FIG. 2A shows a sample image from which image data in the field of view 26 of a camera 20 is generated. A computer 40 is used to process image data from cameras 20 using computer vision in order to detect the presence of one or more optical markers 14 within the optical markers dictionary 19.

In exemplary configuration, a processor is in communication with the camera 20 in order to receive and process the image data from a camera 20. A processor is included in a computer. The processor applies image classification approaches to detect the presence of optical markers 14 in the image data received from the camera 20. Machine learning, such as neural networks, may be employed. Some employed aspects of computer vision of the current embodiments include object detection and recognition, shape detection, blob analysis, position analysis, motion tracking, motion estimation, thresholding, optical character recognition, optical decoding (eg machine-readable optical label formats such as QR codes), and other aspects. Representative object detection approaches include Viola Jones object detection, Single Shot MultiBox Detector, You Only Look Once, neural network based, Faster RCNN, and others known in the art. To illustrate, computer vision can be applied to the image data from the camera 20 to detect optical markers 14, determine distance from the camera 20, determine position within the image data, determine relative position within the image data, and other image processing. One or more optical markers 14 may be detected.

Figure 5A:
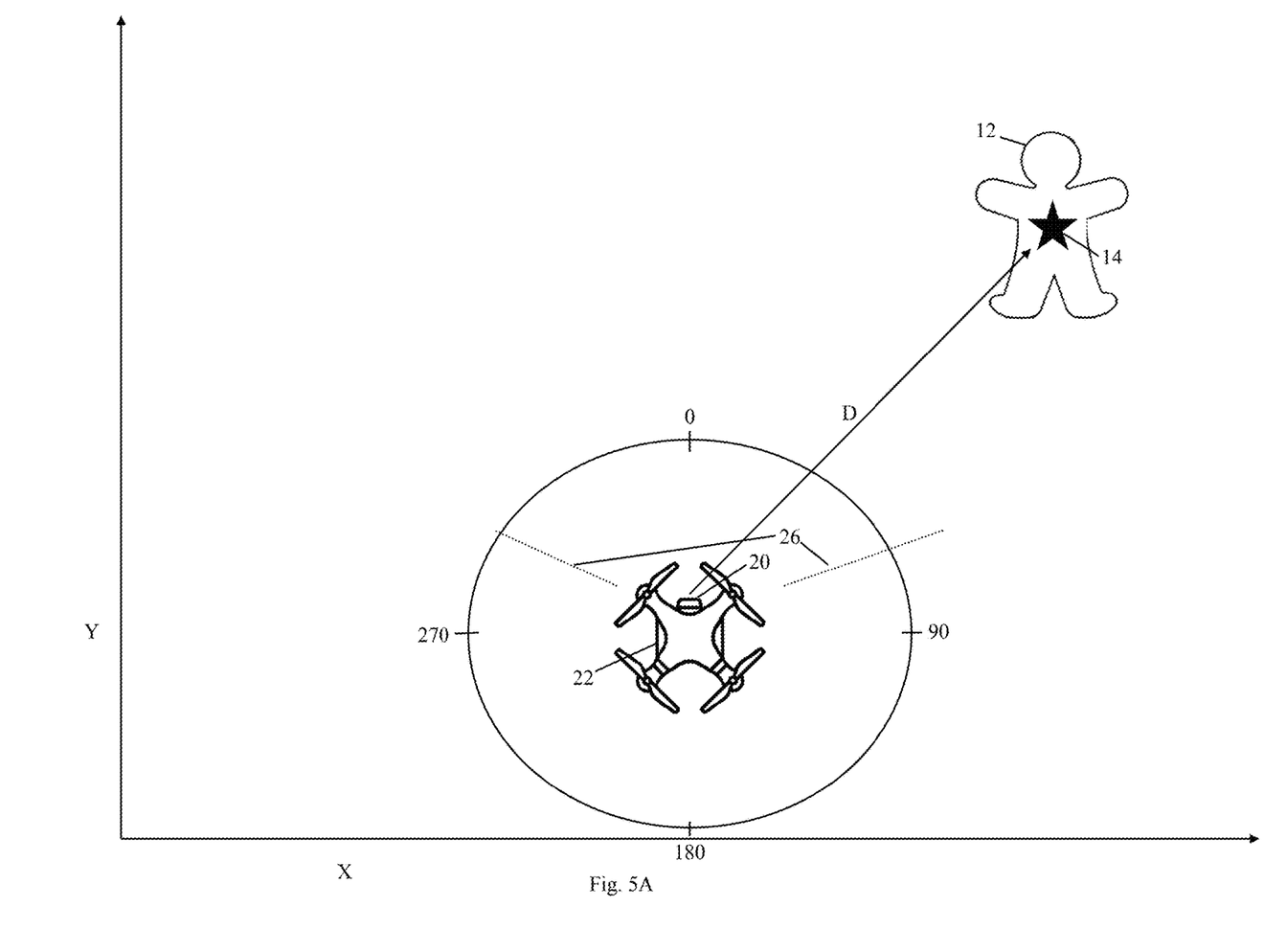
FIGS. 5A and 5B depict a diagram of major components of a system for an embodiment of the current invention as it may exist in operation.
Figure 5B:
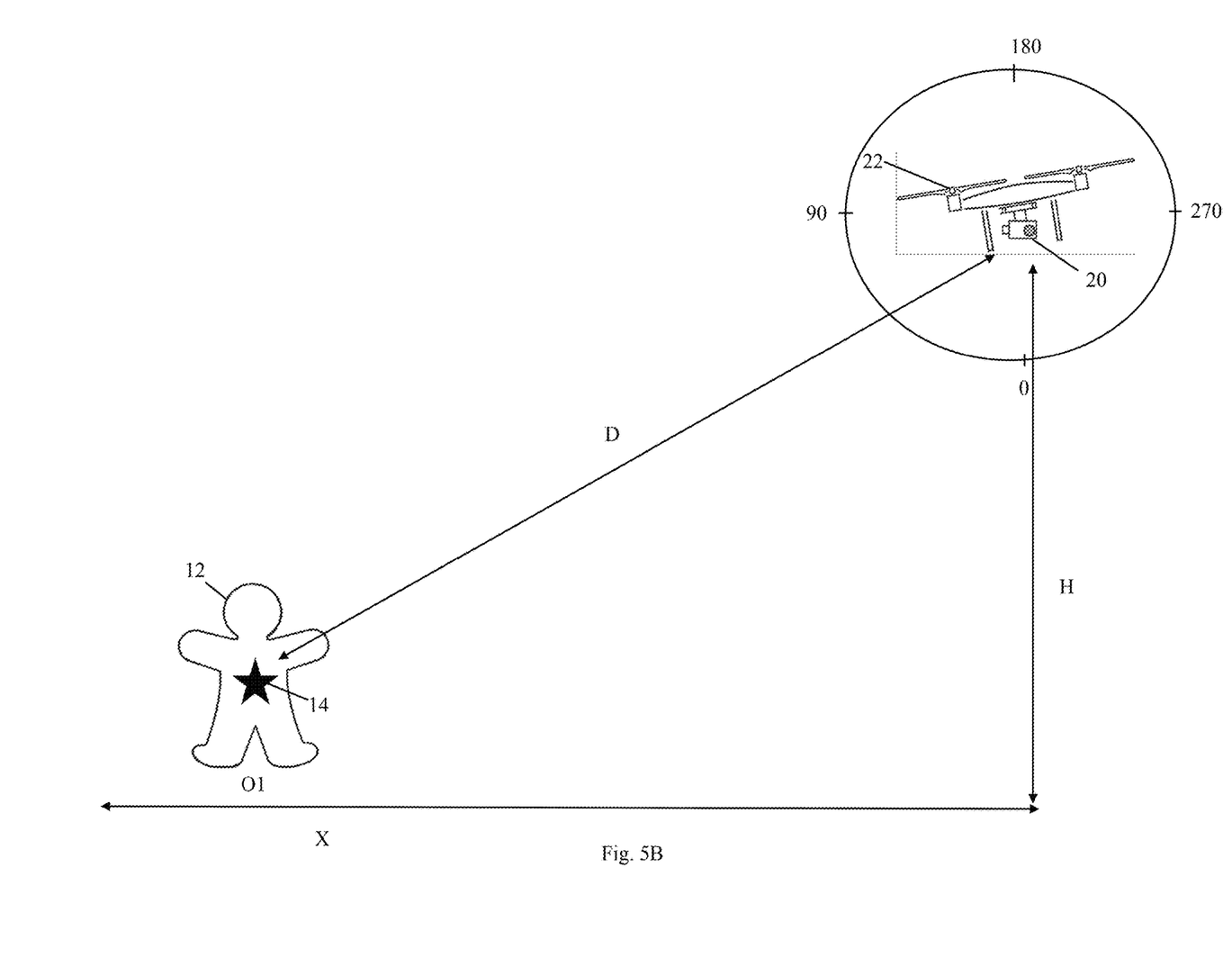

At step 170, position information for detected optical markers 14 is determined. FIGS. 2C, 5A, and 5B illustrate aspects of determining position information for detected optical markers 14. If one or more optical markers 14 are detected, its position and its corresponding assigned person 12 are determined. A position relative to the camera 20 for each of the detected optical markers 14 is determined. In exemplary configuration, computer vision is employed to determine relative positions. In certain configurations, the distance and angle of an optical marker 14 relative to the camera 20 is employed to determined a relative position. Representative information employed for computer vision based distance and angle determination includes optical marker 14 dimensions, camera information (such as lens, focal point, field width, position of the camera, orientation of the camera . . . ), camera settings for an image (such as zoom settings, field width, . . . ), optical marker 14 position in the image frame, optical marker 14 size in the image frame, changes in optical marker 14 position or dimensions across image frames, reference objects, image resolution, other optical marker 14 position information, and other information. For example, approaches such as stereo photography, triangle similarity, motion analysis, trajectory-based projections, and other means known in the art can be employed for computer vision based distance determination of the optical marker 14. Other configurations employ laser range finder, radar, lidar, ultrasonic, and other means known in the art for distance determination.

For example, approaches such as position in image data and other means known in the art can be employed for computer vision based determination of the angle orientation relative to the camera 20. Other configurations employ global navigation system data (eg bearing), compasses, motion analysis, trajectory-based projections, and other means known in the art for angular determination.

Information such as the distance and relative angle provide relative position information for the optical marker 14. Further information may supplement relative position determination such as altitude information. Using the relative position information of the optical marker 14, a projection from the camera 20 position to determine position information for that optical marker 14.

Figure 6:
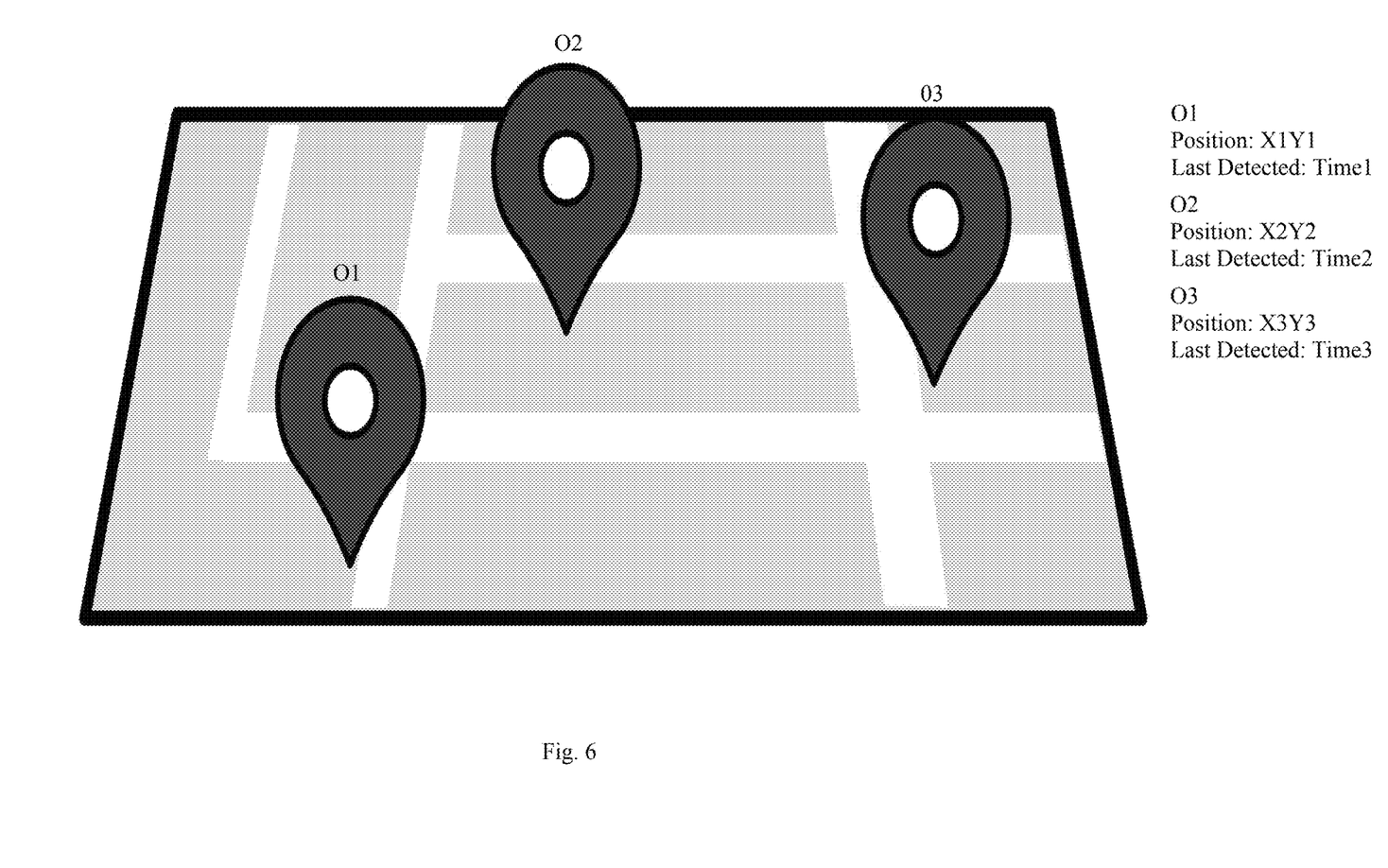
FIG. 6 depicts representative communication of tracked objects.

At step 180, position information is disseminated. The position information and associated person 12 information may be displayed on a map, or otherwise communicated. FIGS. 1 and 6 illustrate configurations where the position information of the optical markers 14 is displayed on a map on a computer 40 display. Using the position information of the camera 20 and the position information of the optical marker(s) 14, indicia are displayed on a map at the location corresponding to the associated position information. Additional information such as the associated object identifier, timestamp, and position details may also be communicated. In other configurations, the position information is transmitted. Such configuration can include wireless transmissions, such as burst transmission, for example, transmission of optical marker 14 position information in the area of the camera(s) 20 field(s) of view for display to persons 12 within the area or enabling/disabling weapons based on position and/or orientation information.

The camera 20 is monitored for the duration of the session 130.

Insofar as the description above and the accompanying drawing disclose any additional subject matter that is not within the scope of the single claim below, the inventions are not dedicated to the public and the right to file one or more applications to claim such additional inventions is reserved.

What is claimed is:

1. A method for tracking objects comprising:
receiving an optical marker dictionary comprised of one or more optical markers, said optical markers comprising optically distinct indicators associating an optical marker within said optical marker dictionary with an object and affixing said optical marker to said object;
a processor in communication with a camera, said processor receiving image data from said camera;
said processor applying computer vision to said image data in order to detect the presence of one or more optical markers within said optical marker dictionary within said image data;
said processor determining camera position information, wherein said camera position information is determined by time of flight processing from a device with a known location;
said processor applying computer vision to said image data in order to determine relative position information for said detected optical markers; and
employing said camera position information and said detected optical markers relative position as input, said processor projecting a position from said camera to said detected optical marker.

2. The method of claim 1, wherein said optical markers comprises machine-readable optical label formats.

3. The method of claim 1, wherein said optical markers are outside the visible spectrum.

4. The method of claim 1, wherein said optical markers are displayed on a print surface.

5. The method of claim 1, wherein said optical markers are displayed on an electronic visual display.

6. The method of claim 1, wherein input for said camera position information further includes position information from a global navigation system.

7. The method of claim 1, wherein input for said camera position information further includes relative position information from an origin point.

8. The method of claim 1, wherein input for said camera position information further includes relative position information from an anchor node.

9. The method of claim 1, wherein said image data includes camera information and camera settings.

10. The method of claim 1, wherein computer vision is employed to determine said relative position.

11. A system for tracking objects, said system comprising:
providing a processor configured to perform the following:
receive an optical marker dictionary comprised of one or more optical markers;
said optical markers comprising optically distinct indicators to be displayed on an object and associated with said object;
said processor in communication with a camera, receiving image data from said camera;
said processor applying computer vision to said image data in order to detect the presence of one or more optical markers within said optical marker dictionary within said image data;
said processor receiving a camera position information, wherein said camera position information is determined by time of flight processing from a device with a known location;
said processor applying computer vision to said image data in order to determine relative position information for said detected optical markers; and
employing said camera position information and said detected optical markers relative position as input, said processor projecting a position from said camera to said detected optical marker.

12. The system of claim 11, wherein said optical marker generated with target dimensions, and said target dimensions received by said processor.

13. The system of claim 11, wherein said optical markers are displayed on a fabric surface.

14. The system of claim 11, wherein computer vision is employed to determine said relative position.

15. The system of claim 11, wherein laser range finder or lidar input is employed to determine said relative position.

16. An unmanned aerial vehicle for tracking objects, said unmanned aerial vehicle comprising:
a processor and camera;
said processor configured to perform the following:
receive an optical marker dictionary comprised of one or more optical markers;
said optical markers comprising optically distinct indicators to be displayed on an object and associated with said object;
said processor in communication with said camera, receiving image data from said camera;
said processor applying computer vision to said image data in order to detect the presence of one or more optical markers within said optical marker dictionary within said image data;
said processor receiving a camera position information, wherein said camera position information is determined by time of flight processing from a device with a known location;
said processor applying computer vision to said image data in order to determine relative position information for said detected optical markers; and
employing said camera position information and said detected optical markers relative position as input, said processor projecting a position from said camera to said detected optical marker.

17. The unmanned aerial vehicle of claim 16, further comprising a global navigation system communicating position information to said processor as additional input for said camera position.

18. The unmanned aerial vehicle of claim 16, further comprising a printer, operable to imprint an optical mark to a print surface.

19. The unmanned aerial vehicle of claim 16, wherein computer vision is employed to determine said relative position.

* * * * *